(12) United States Patent
Ochiai et al.

(10) Patent No.: US 6,626,218 B1
(45) Date of Patent: Sep. 30, 2003

(54) PNEUMATIC TIRE AND METHOD FOR MANUFACTURING PNEUMATIC TIRE

(75) Inventors: Kiyoshi Ochiai, Kobe (JP); Takeshi Ishikawa, Kakogawa (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/623,984

(22) PCT Filed: Feb. 1, 2000

(86) PCT No.: PCT/JP00/00532
§ 371 (c)(1),
(2), (4) Date: Nov. 9, 2000

(87) PCT Pub. No.: WO00/46049
PCT Pub. Date: Aug. 10, 2000

(30) Foreign Application Priority Data

Feb. 1, 1999 (JP) .............................................. 11-24190

(51) Int. Cl.⁷ ......................... B60C 19/12; B29D 30/30
(52) U.S. Cl. ..................... 152/503; 156/115; 156/133
(58) Field of Search ................. 152/504, 505, 152/503; 156/115, 123, 133, 145, 146

(56) References Cited

U.S. PATENT DOCUMENTS 1,419,470 A    6/1922   Reasoner et al.
4,239,076 A   12/1980   Chautard et al.
4,388,261 A *  6/1983   Codispoti et al. ........... 156/115

FOREIGN PATENT DOCUMENTS

| DE | 198 39 911 A1 | 3/2000 |
| EP | 0893236 A1 | 1/1999 |
| JP | B1-3410934 | 12/1959 |
| JP | A4726433 | 10/1972 |
| JP | A4726481 | 10/1972 |
| JP | A4849864 | 7/1973 |
| JP | B1-5025683 | 8/1975 |
| JP | A53124803 | 10/1978 |
| JP | A6064834 | 4/1985 |
| JP | 8323875 A | 12/1996 |

* cited by examiner

*Primary Examiner*—Geoffrey L. Knable
(74) *Attorney, Agent, or Firm*—Birch, Stewart, Kolasch & Birch, LLP

(57) ABSTRACT

A pneumatic tire 1 having a toroidal shape in which bead portions 4 are connected to sidewall portions 3 extending radially inward from opposite ends of a tread portion 2 and a sealant 6 for preventing a blowout is disposed to extend in a circumferential direction in the tread portion 2. A seal unit 7 formed by sealing the sealant 6 for preventing the blowout in a sack-shaped member in advance is disposed to extend in the circumferential direction of the tire in the tread portion 2 prior to vulcanization.

6 Claims, 7 Drawing Sheets

PNEUMATIC TIRE AND METHOD FOR MANUFACTURING PNEUMATIC TIRE

This application is the national phase under 35 U.S.C. §371 of PCT International Application No. PCT/JP00/00532 which has an International filing date of Feb. 1, 2000, which designated the United States of America.

TECHNICAL FIELD

The present invention relates to a tubeless pneumatic tire in which air leakage from a puncture in a tread due to running over of a nail and the like can be suppressed and a method of producing the same.

BACKGROUND TECHNIQUE

As one of means for preventing generation of air leakage from a puncture portion due to running over of a nail and the like, there is proposed a pneumatic tire having a seal layer in which a puncture sealant for sealing a nail puncture and the like is sealed inside a tread.

Such a tire can be produced by directly coating an inner liner rubber bonded to a molding former with the sealant, then by bonding a carcass ply and a tread rubber to mold a tire raw cover in a raw cover molding step before vulcanization, and by vulcanizing the tire raw cover.

As another method, there is proposed (Japanese Patent Application Laid-open No. 8-323875, for example) a method in which a tire t is vulcanized to form a sack-shaped portion d where inner liner rubber a does not adhere to a sealing rubber sheet b by applying a mold release agent c such as talc between the inner liner rubber a facing a tire inner cavity and the sealing rubber sheet b attached to an inside of the inner liner rubber a and a puncture sealant is injected through an injection hole e communicating with an inside of the sack-shaped portion d by using an injector f after the vulcanization as shown in FIG. 7.

In the former method, however, the step for applying the sealant is troublesome, variations are generated in dimensions of the application, and it is difficult to obtain a uniform seal layer and the uniform tire. In the latter method, because the injection step for injecting the sealant into the sack-shaped portion d after vulcanization of the tire is necessary and a closing step for closing the injection hole e for injecting the sealant is required additionally, a producing process becomes complicated.

DISCLOSURE OF THE INVENTION

The present invention has been accomplished with the above circumstance in view and it is an object of the invention to provide a pneumatic tire having a puncture sealing function which can be produced easily without the above application step and injection step of the sealant and the closing operation of the injection hole and a method of producing the same.

To achieve the above object, a pneumatic tire of the invention has a toroidal shape in which bead portions are connected to sidewall portions extending radially inward from opposite ends of a tread portion and a sealant for preventing a blowout is disposed to extend in a circumferential direction in the tread portion, wherein a seal unit formed by sealing the sealant for preventing the blowout in a sack-shaped member in advance is disposed to extend in the circumferential direction of the tire in the tread portion prior to vulcanization.

A method of producing a pneumatic tire having a toroidal shape in which bead portions are connected to sidewall portions extending radially inward from opposite ends of a tread portion and a sealant for preventing a blowout is disposed to extend in a circumferential direction in the tread portion comprises: an inner liner rubber bonding step for bonding an inner liner rubber onto a molding former; a seal layer forming step for bonding a seal unit formed by sealing the sealant for preventing the blowout in a sack-shaped member in advance to an outer face of the inner liner rubber and forming a seal layer such that the seal layer extends in the circumferential direction of the tire, a carcass ply bonding step for bonding a carcass ply to an outside of the seal unit, a raw cover body forming step for adding other tire main body structure material including bead cores to form a raw cover body; and a vulcanizing step for vulcanizing the raw cover body.

PREFERRED EMBODIMENT OF THE INVENTION

Figure 1:
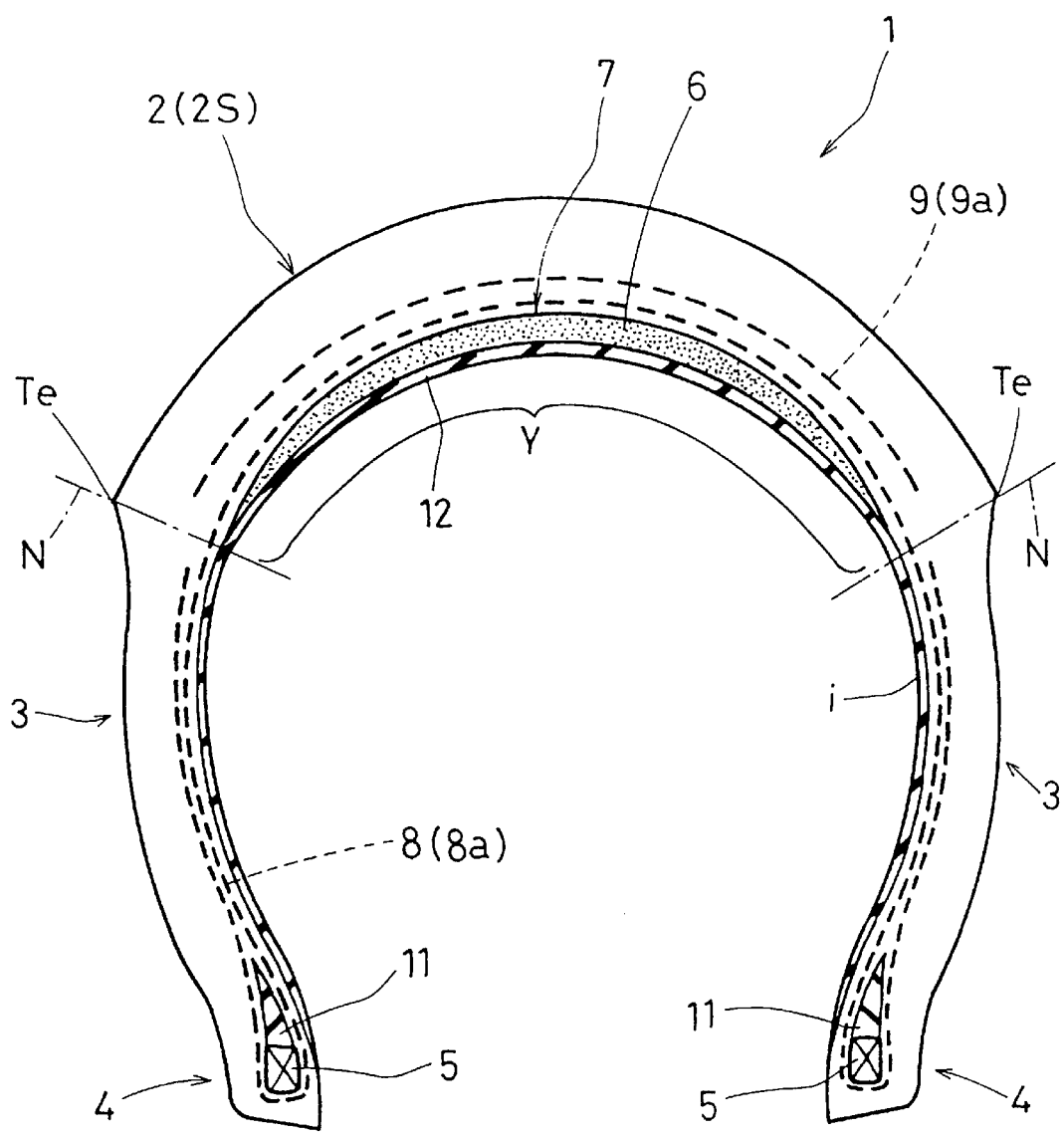
FIG. 1 is a sectional view of an embodiment of a pneumatic tire.

An embodiment of a pneumatic tire and a method of producing the tire according to the invention will be described by taking a tire for a motorcycle as an example of the pneumatic tire and based on the drawings. FIG. 1 shows the tire 1 for the motorcycle (hereafter this may be merely referred to as "the tire"). The tire 1 has a toroidal shape in which bead portions 4 are respectively provided to inside ends of sidewall portions 3 extending radially inward from opposite ends of a tread portion 2 and a seal unit 7 formed by sealing a sealant 6 for preventing a blowout into a sack-shaped member in advance is disposed to extend in the tread portion 2 and in a circumferential direction of the tire prior to vulcanization.

The tire 1 in this example is reinforced by a cord layer including a toroidal carcass 8 bridging the bead portions 4, 4 and a breaker 9 disposed on a radially outside of the carcass 8 and on an inside of the tread portion 2 and is applied with required tire strength and stiffness. Each the bead portion 4 is provided with a bead apex rubber 11 having a triangular sectional shape and extending radially outward from a bead core 10.

As the carcass 8, one or more carcass plies 8a with a radial or semi-radial structure in which carcass cords are arranged at an angle of 70° to 90° with respect to a circumferential direction or a bias structure in which the carcass cords are arranged at an angle of 35° to 70° are used. The carcass 8 in this example is formed of one carcass ply 8a and opposite ends of the carcass ply 8a are folded back around the bead cores 5 from an axially inside of the tire toward an outside and locked.

The breaker 9 is formed of one or more breaker plies 9a in which breaker cords are arranged at an angle of 0° to 70° with respect to the circumferential direction, but the breaker 9 can be omitted depending on required tire performance.

In the present embodiment, the seal unit 7 is disposed in the tread portion 2 and between the carcass 8 and an inner liner rubber 12 forming a tire inner cavity face i. The inner liner rubber 12 is made of butyl rubber having excellent gas impermeability such as butyl rubber, butyl rubber halide, brominated butyl rubber, has a substantially uniform thickness of about 0.5 to 2.0 mm, for example, and the substantially entire area of an inner face of the carcass 8 is covered with the inner liner rubber 12.

Figure 2:
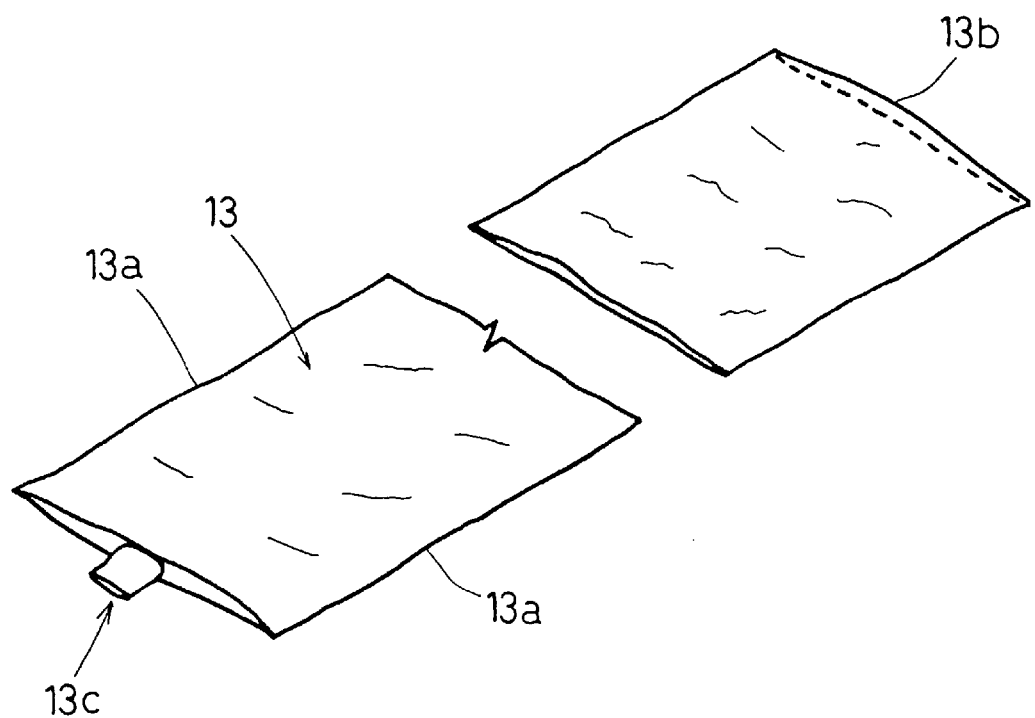
FIG. 2 is a perspective view showing an example of a sack-shaped member.
Figure 3:
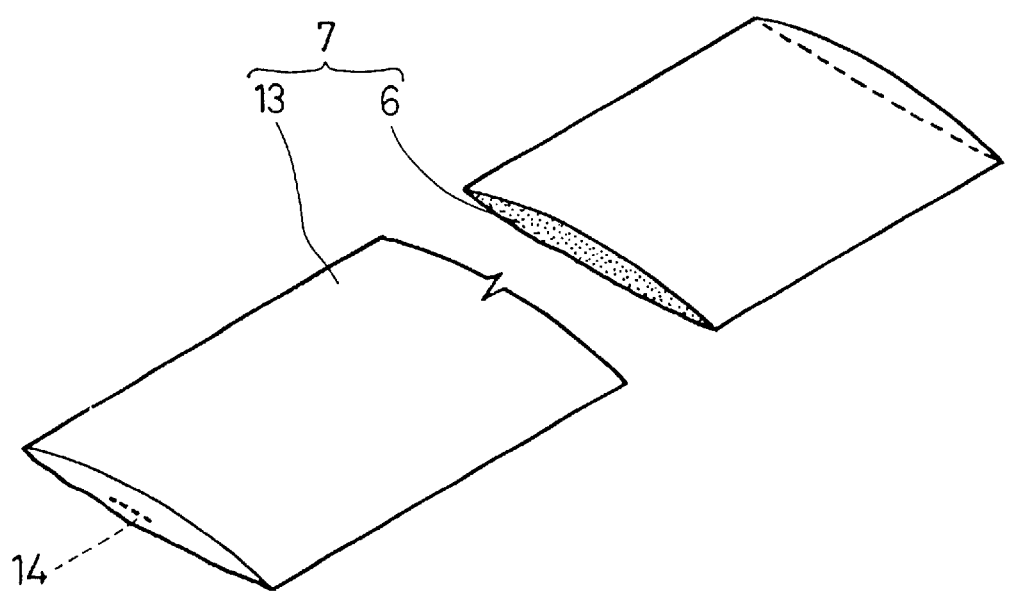
FIG. 3 is a perspective view of an example of a seal unit.

The seal unit 7 is formed by sealing the sealant 6 for preventing the blowout in a sack-shaped member 13 made of a polymer film, for example, in advance as shown in FIGS. 2 and 3. In this example, the sack-shaped member 13 has a sack shape in which opposite side edges 13a, 13a and a bottom portion 13b of the sack-shaped member 13 are closed and an injection opening 13c for injecting the sealant 6 is provided to an end of the sack-shaped member 13. Width and length dimensions of the sack-shaped member 13 are properly determined according to a size of the tire to be used or the like. In the seal unit 7, after injecting the sealant 6 into the sack-shaped member 13, for example, without trapping air and the like in the sack-shaped member 13, the injection opening 13c is closed by thermocompression bonding or the like to form a closed portion 14.

As a result, the band-shaped seal unit 7 having a substantially uniform cross-sectional area is formed. Such a seal unit 7 has excellent portability and a shape of the seal unit 7 with a constant width and a constant length is stable due to existence of the sack-shaped member 13, which contributes to uniformalization of a shape of a seal layer and the like. By disposing such a seal unit 7 formed by sealing the sealant 6 for preventing the blowout in the sack-shaped member 13 in advance in the tread portion 2 before vulcanization, it is extremely easy to handle the sealant 6 in producing the tire, the shape of the seal layer can be uniformalized, and the steps of injecting the sealant 6 by using the injector or the like after vulcanization and closing the injection opening after vulcanization can be omitted, thereby making production of the tire easier.

It is preferable that such a seal unit 7 constitutes 70% or more and preferably 80% or more of a length of a tread inside area Y in a tire meridional section, for example. The "tread inside area Y" refers to an area on the tire inner cavity face i sandwiched between normals N, N to a tread face 2S at tread edges Te.

Material forming the sack-member 13 of the seal unit 7 is preferably polymer film material and may be material with or without rubber mold releasing property. The material having a proper degree of extensibility so as to be expanded with surrounding rubber in molding and vulcanization of the raw cover of the tire is particularly preferable. As such film material, material in which an elongation of 20% or more is produced by a load of 400 g per a width of 8 mm of the film is particularly preferable, for example.

As the material of the sack-shaped member 13, polyfluoroethylene resin that is Teflon (a trademark that belongs to DuPont) is preferable and required extensibility can be obtained by setting a thickness of the material at 0.05 mm to 0.15 mm and 0.1 mm, for example. In addition to the polyfluoroethylene resin, a nylon film may be also used. The nylon film mainly made of nylon 6 (under a trade name of "Rayfan NO" and produced by Toray Synthetic Film Co., Ltd.), for example, is particularly preferable. Physical properties of such a nylon film are shown in Table 1.

TABLE 1

| Item | Unit | Value of physical property | Measuring method |
|---|---|---|---|
| Density | g/cm$^3$ | 1.13 | Density gradient tube method |
| Melting point | °C. | 215 | |
| Tensile strength | kg/mm$^2$ | 6–9 | ASTM-D882 |
| Elongation | % | 300–400 | ASTM-D882 |
| Young's modulus | kg/mm$^2$ | 45–55 | ASTM-D882 |
| Tear strength | g | 50–60 | ASTM-D1922 |
| Impact strength | kg-cm/mm | 1600 | Falling ball impact method |
| Water vapor permeability | g/m$^2$ day 0.1 mm | 60–80 | JIS-Z208 40° C. RH 90% |
| Oxygen permeability | c.c./m$^2$ day atm 0.1 mm | 6 | ASTM-D1434 20° C. dry |
| Haze | % | 4–6 | JIS-K6718 |
| Coefficient of static friction | — | 0.5–0.7 | |

As a result of various experiments carried out by the inventors, it has been shown that the sack-shaped member 13 has the rubber mold releasing property and have satisfactory extensibility even if a thickness of the member 13 is about 25μ, for example, when such a nylon film is used for the member 13. In addition to the nylon film in the above example, a general polyethylene film, for example, may be employed.

As the above sealant 6, viscous material with a coefficient of viscosity of 2.0 to 10.0 mPa·s (temperature: 20° C.), for example, which is in a liquid state at room temperature (20° C.) can be used satisfactorily. Moreover, various liquid puncture sealants which enters and seals the nail puncture and the like at a temperature in a range of −20° C. to 60° C. and delays leakage of tire inner pressure can be used. In this example, a mixture of butyl rubber and polybutene is used as the sealant 6 and a mixture ratio is preferably 40 to 60: 60 to 40 by weight, for example.

Next, an example of the method of producing the tire 1 will be described.

The method of producing the tire of the present embodiment includes an inner liner rubber bonding step, a seal layer forming step, a carcass ply bonding step, and a raw cover body forming step, and a vulcanizing step.

Figure 4:
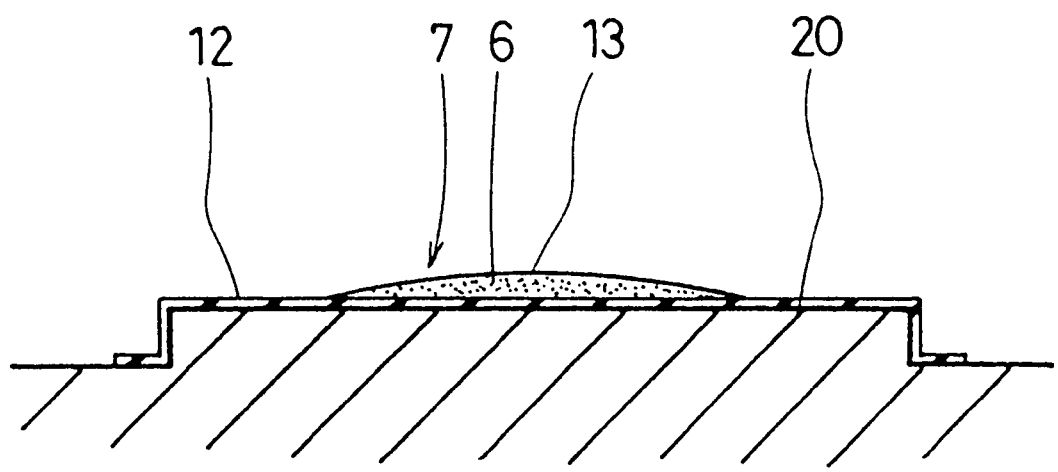
FIG. 4 is a schematic sectional view of an inner liner rubber bonding step and a seal layer forming step.

In the inner liner rubber bonding step, as schematically shown in FIG. 4, the inner liner rubber 12 cut to a predetermined width and a predetermined length is bonded onto a cylindrical molding former 20. Then, in the seal layer forming step, as schematically shown in FIG. 4, the seal unit 7 formed by sealing the sealant 6 for preventing the blowout in the sack-shaped member 13 in advance is wound around an outer face of the inner liner rubber 12 in an area corresponding to the tread portion 2 to form the seal layer extending in a circumferential direction of the tire.

Thus, in the method of producing the tire according to the invention, the conventional step of applying the mold release agent and the sealant to the inner liner rubber one by one can be replaced by the extremely simple operation of bonding the seal unit 7 with constant width and thickness to a predetermined position of the inner liner rubber 12. As a result, the operation is substantially simplified and productivity may be improved. At this time, the seal unit 7 is wound such that an overlap portion in which a winding starting end and a winding finishing end overlap each other in a radial direction is formed.

Figure 5:
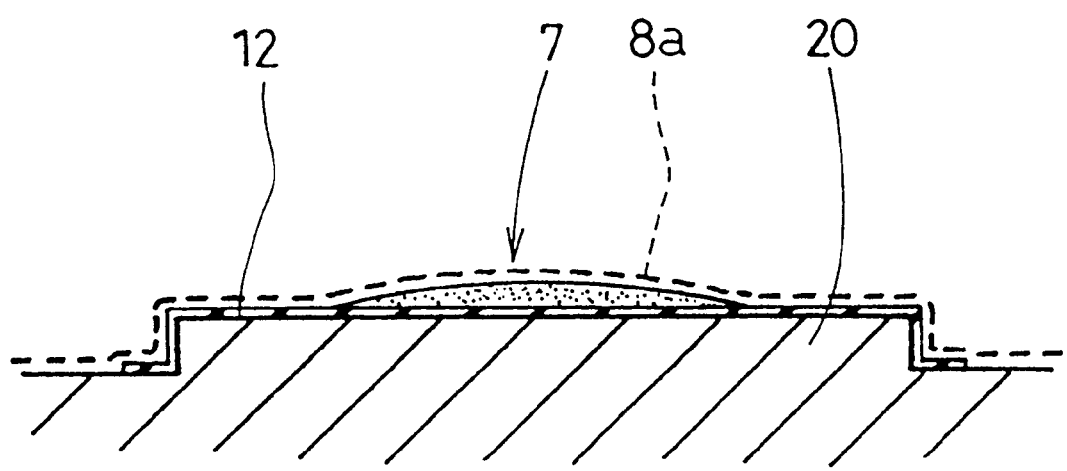
FIG. 5 is a schematic sectional view schematically showing a carcass ply bonding step.
Figure 6:
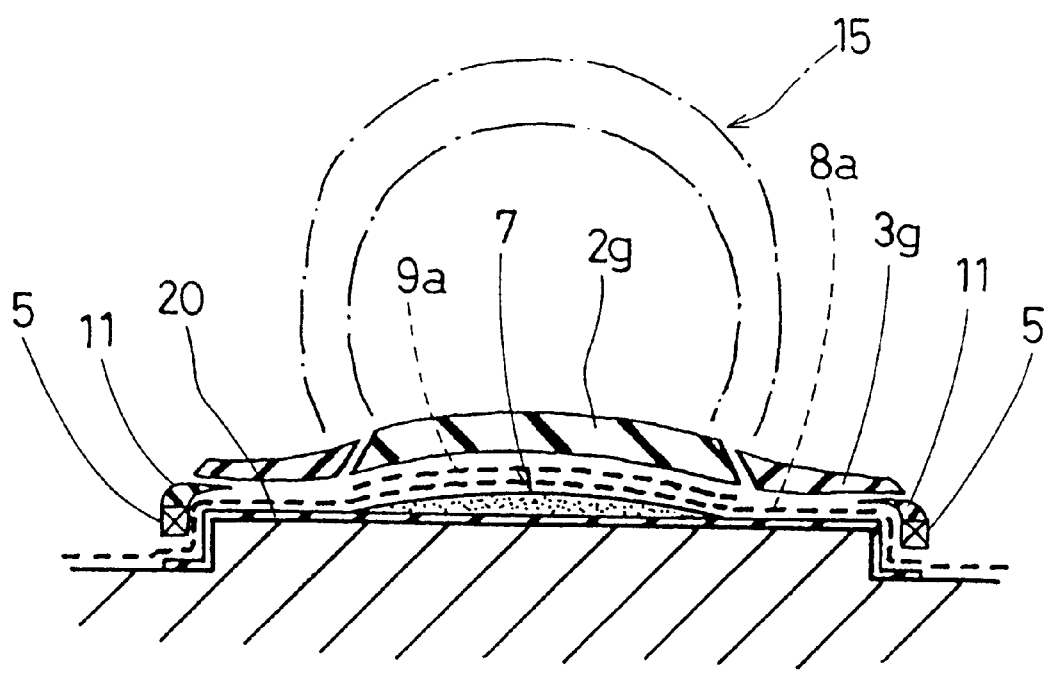
FIG. 6 is a schematic sectional view schematically showing a raw cover body forming step.
Figure 7:
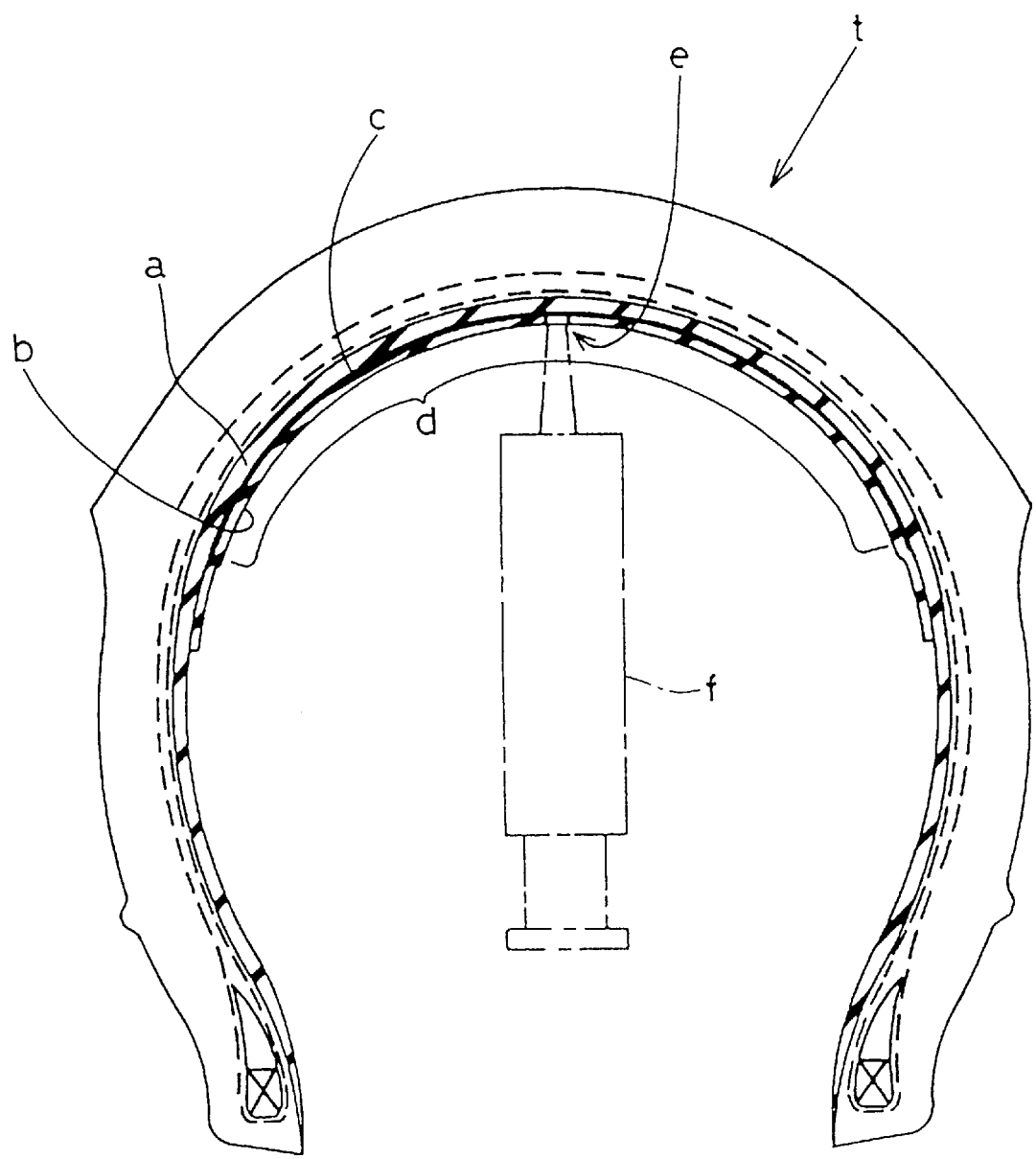
FIG. 7 is a sectional view for explaining a conventional method of producing a pneumatic tire.

In the carcass ply bonding step, as schematically shown in FIG. 5, the carcass ply 8a is bonded to an outside of the seal unit 7 by winding the carcass ply 8a around the seal unit 7. In the raw cover body forming step, as schematically shown in FIG. 6, other tire main body structure material including bead cores 5, 5, e.g., a breaker ply 9a, a tread rubber 2g, sidewall rubbers 3g, bead apex rubbers 11, and the like are added and this is expanded into a toroidal shape to form the raw cover body 15. Opposite ends of the carcass ply 8a are folded back, for example, prior to expanding deformation into the toroidal shape.

In the vulcanizing step, the raw cover body 15 is cast into a vulcanizing mold to carry out vulcanization at predetermined temperature and pressure, thereby obtaining the pneumatic tire 1 as shown in FIG. 1. The sack-shaped member of the seal unit 7 can be elongated in the circumferential direction of the tire with expanding deformation in the raw cover body forming step and the vulcanizing step.

As described above, according to the method of producing the pneumatic tire of the present embodiment, because the seal unit 7 with uniform width and thickness is bonded to the inner liner rubber instead of applying the mold release agent or the sealant, the pneumatic tire 1 can be obtained in which efficiency of the operation in producing the tire is excellent, the seal layer can be formed with accuracy and stabilized, variations in volume of the seal layer can be avoided, and the thickness of the layer of the sealant 6 can be uniformalized.

Although the pneumatic tire in which the seal unit 7 is formed between the inner liner rubber 12 and the carcass ply 8a is shown as an example in the present embodiment, the seal unit 7 may be provided in various other positions. For example, the seal unit 7 may be disposed between the carcass ply 8a and the breaker ply 9a, between the breaker ply 9a and the tread rubber 2g, or between the inner liner rubber 12 forming the tire inner cavity face and a second inner liner rubber provided inside the inner liner rubber 12. If a plurality of carcass plies 8a are provided, the seal unit 7 may be disposed between the carcass plies 8a. Such pneumatic tires may be produced by the method similar to the above method by bonding the seal unit 7 to a position where the seal layer is to be formed.

As described above, according to the invention, in the pneumatic tire in which the sealant for preventing the blowout sealed by a sealing rubber sheet is disposed to extend in a circumferential direction in the tread portion, the seal unit formed by sealing the sealant for preventing the blowout in the sack-shaped member in advance is disposed to extend in the circumferential direction of the tire in the tread portion prior to the vulcanization. Therefore, it is unnecessary to apply the sealant to the inner liner rubber in every tire production and it is possible to easily form the uniform seal layer with accuracy by using the seal unit. Because the injection step for injecting the sealant and the closing step for closing the injection hole for injecting the sealant are unnecessary after the tire vulcanization, the producing process can be substantially simplified.

According to the method of producing the pneumatic tire of the invention, the seal layer can be formed by the simple operation in which the seal unit formed in advance with uniform width and thickness is bonded to the inner liner rubber instead of applying the mold release agent or the sealant. Therefore, efficiency of the operation is excellent and the width of the seal layer and the like may be controlled with high accuracy. As a result, variations in volume of the sealant can be avoided and the pneumatic tire in which the thickness of the layer of the sealant is uniformalized can be produced easily and efficiently.

EXAMPLE

A tire for a motorcycle of a tire size of 3.00-10 was produced for trial according to the above producing method by using a seal unit shown in Table 2 to obtain a satisfactory pneumatic tire shown in FIG. 1. Then, the pneumatic tire was mounted to a rim and inflated. A nail with a diameter of 3 mm was stuck in the tire from a surface side of a tread portion and pulled out. When inner pressure was measured after traveling about 200 km, about 85% or more of the inner pressure before sticking of the nail was maintained and almost no reduction in the inner pressure occurred.

TABLE 2

| Specifications of the seal unit | |
|---|---|
| Sack-shaped member | |
| Material | Polyfluoroethylene |
| Width (mm) | 100 |
| Length (mm) | 800 |
| Cross-sectional area (mm$^2$) | 150 |
| Sealant composition | |
| Butyl rubber | 60 parts by weight |
| Polybutene | 40 parts by weight |
| White filler | 18 parts by weight |
| Zinc oxide | 3 parts by weight |

What is claimed is:

1. A pneumatic tire having a toroidal shape in which bead portions are connected to sidewall portions extending radially inward from opposite ends of a tread portion and a sealant for preventing a blowout is disposed in the form of a single elongated chamber to extend in a circumferential direction in said tread portion, wherein a seal unit formed by sealing said sealant for preventing said blowout in a sack member in advance is disposed to extend in said circumferential direction of said tire in said tread portion prior to vulcanization of the tire, and wherein the single elongated chamber has one opening portion for injecting the sealant at an end of the single elongated chamber in the circumferential direction of the tire, said opening adapted to be closed after the sealant is injected into the elongated chamber, and said sack member is formed by polyfluoroethylene film, or nylon film, or polyethylene film.

2. The tire according to claim 1, wherein said sealant is formed by viscous material with a coefficient of viscosity of 2.0 to 10.0 mPa's (temperature: 20° C.).

3. The tire according to claim 1, wherein said sealant includes at least butyl rubber and polybutene.

4. A method of producing a pneumatic tire having a toroidal shape in which bead portions to sidewall portions are connected extending radially inward from opposite ends of a tread portion and a sealant for preventing a blowout is disposed to extend in a circumferential direction in the tread portion, said method comprising the steps:

(i) bonding an inner liner rubber onto a molding former;
(ii) forming a seal unit by sealing the sealant for preventing a blowout in a sack member in advance and then bonding the seal unit to an outer face of said inner liner rubber, to form a seal layer within the sack member without interior ribs or walls so as to have only a single cavity such that said seal layer extends in the circumferential direction of said tire;
(iii) bonding a carcass ply to an outside of said seal unit;
(iv) forming a raw cover body and adding other tire main body structure material including bead cores; and (v) vulcanizing said raw cover body, wherein
the single elongated chamber has one opening portion for injecting the sealant at an end of the single elongated chamber in the circumferential direction of the tire, said opening adapted to be closed after the sealant is injected into the elongated chamber, and said sack member is formed by polyfluoroethylene film, or nylon film, or polyethylene film.

5. The method according to claim 4, wherein said sealant is formed by viscous material with a coefficient of viscosity of 2.0 to 10.0 mPa's (temperature: 20° C.).

6. The method according to claim 4, wherein said sealant includes at least butyl rubber and polybutene.

* * * * *